(12) United States Patent
Patel et al.

(10) Patent No.: US 10,333,365 B2
(45) Date of Patent: Jun. 25, 2019

(54) END WINDING SUPPORT SEGMENT WITH INTEGRATED LUBRICANT MANIFOLD

(71) Applicant: Hamilton Sundstrand Corporation, Charlotte, NC (US)

(72) Inventors: Dhaval Patel, Loves Park, IL (US); Glenn W. Hufstedler, Loves Park, IL (US); Ted A. Martin, Byron, IL (US); Eric A. Brust, Machesney Park, IL (US); Shaun Maconaghy, Shabbona, IL (US); Kevin J. Koester, Winnebago, IL (US); Doren C. Smith, Rockford, IL (US); Alan D. Hanson, Winnebago, IL (US); William D. Sherman, Kingston, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 598 days.

(21) Appl. No.: 14/598,777

(22) Filed: Jan. 16, 2015

(65) Prior Publication Data
US 2016/0211712 A1 Jul. 21, 2016

(51) Int. Cl.
*H02K 3/30* (2006.01)
*H02K 5/20* (2006.01)
*H02K 3/38* (2006.01)
*H02K 3/52* (2006.01)
*H02K 9/19* (2006.01)
*H02K 7/00* (2006.01)

(52) U.S. Cl.
CPC .............. *H02K 3/38* (2013.01); *H02K 3/30* (2013.01); *H02K 3/527* (2013.01); *H02K 5/20* (2013.01); *H02K 9/19* (2013.01); *H02K 7/003* (2013.01)

(58) Field of Classification Search
CPC ............ H02K 3/30; H02K 3/38; H02K 3/527; H02K 5/20; H02K 3/34; H02K 3/345
USPC .................. 310/194, 216, 105, 216.115, 270
See application file for complete search history.

(56) References Cited

U.S. PATENT DOCUMENTS

| 918,498 A | 4/1909 | Behrend |
| 2,945,140 A | 7/1960 | Drabik et al. |
| 5,003,207 A * | 3/1991 | Krinickas ................ H02K 9/19 310/184 |
| 6,727,634 B2 * | 4/2004 | Tornquist ............... H02K 3/527 310/270 |
| 6,791,230 B2 | 9/2004 | Tornquist et al. |

(Continued)

FOREIGN PATENT DOCUMENTS

| EP | 2713482 A2 | 4/2014 |
| WO | WO2007/146246 A2 | 12/2007 |
| WO | WO2015/034514 A1 | 3/2015 |

OTHER PUBLICATIONS

Extended European Search Report, for European Patent Application No. 16151230.6, dated Jun. 1, 2016, 8 pages.

*Primary Examiner* — Burton S Mullins
(74) *Attorney, Agent, or Firm* — Kinney & Lange, P.A.

(57) ABSTRACT

An end winding support segment for a generator rotor includes a support segment body with a curved inner surface configured to be adjacent to a rotor shaft, a winding support arm extending radially outward from the support segment body, and an orifice extending from the curved inner surface of the support to an exterior surface of the support adjacent the winding support arm with the orifice configured to transfer lubricant from a surface of the rotor shaft to a winding located on the winding support arm.

12 Claims, 5 Drawing Sheets

(56) References Cited

U.S. PATENT DOCUMENTS

| | | | |
|---|---|---|---|
| 6,849,987 B2 * | 2/2005 | Tornquist | H02K 3/527 |
| | | | 310/260 |
| 6,882,079 B2 | 4/2005 | Kilpatrick et al. | |
| 6,979,929 B2 | 12/2005 | Tornquist et al. | |
| 7,786,630 B2 | 8/2010 | Waddell et al. | |
| 8,018,114 B2 | 9/2011 | Rasmussen et al. | |
| 8,232,702 B2 | 7/2012 | Zywot et al. | |
| 8,269,393 B2 * | 9/2012 | Patel | H02K 3/527 |
| | | | 310/194 |
| 8,339,011 B2 * | 12/2012 | Vanderzyden | H02K 1/24 |
| | | | 29/598 |
| 8,853,911 B2 | 10/2014 | Lemmers, Jr. | |
| 9,712,027 B2 * | 7/2017 | Birolleau | H02K 3/527 |
| 9,837,868 B2 * | 12/2017 | Wirsch, Jr. | H02K 3/24 |
| 2007/0090701 A1 | 4/2007 | Down et al. | |
| 2010/0133946 A1 | 6/2010 | Lemmers, Jr. et al. | |
| 2010/0244614 A1 | 9/2010 | Rasmussen et al. | |
| 2010/0320860 A1 | 12/2010 | Patel et al. | |
| 2011/0133579 A1 | 6/2011 | Vanderzyden | |
| 2012/0126643 A1 | 5/2012 | Zhong | |

\* cited by examiner

END WINDING SUPPORT SEGMENT WITH INTEGRATED LUBRICANT MANIFOLD

BACKGROUND

The present disclosure relates to a generator and, in particular, to a main rotor of a generator.

Typically, a generator includes a rotor having a plurality of windings (made up of electrically conductive wires) wrapped around elongated poles on a rotor core. The rotor is driven to rotate by a source of rotation, a prime mover such as a turbine rotor. The generator rotor rotates in proximity to a stator, and the rotation of the rotor, which is an electromagnet due to electricity running through the windings, induces voltage in the stator. The voltage in the stator can be applied to external electrical components, providing electrical power to those components. During operation, the generator rotor rotates at very high speeds, creating centrifugal forces on the poles and windings that may cause the wires of the windings on the poles to move. End winding supports at each end of the poles are used to support the windings under centrifugal load and ensure that the wires do not move from a desired position.

SUMMARY

An end winding support segment for a generator rotor includes a support body segment with a curved inner surface configured to be adjacent to a rotor shaft, a winding support arm extending radially outward from the support segment body, and an orifice extending from the curved inner surface of the support segment body to an exterior surface of the support segment body adjacent the winding support arm. The orifice is configured to transfer lubricant from a surface of the rotor shaft to a winding located on the winding support arm.

A rotor for a generator includes a shaft, a rotor core radially outward from the shaft and having a plurality of poles spanning axially along the rotor core, and a plurality of end winding support segments that together circumferentially encircle the shaft with each end winding support segment being radially outward from the shaft, adjacent to the rotor core on a flat back surface, and adjacent to another end winding support segment on a circumferential surface. Each end winding support segment includes a support segment body with a curved inner surface adjacent to the shaft, at least one winding support arm extending radially outward from the support segment body and having a flat back surface adjacent to a corresponding pole of the rotor core, and at least one orifice extending from the curved inner surface of the support segment body to an exterior surface of the support segment body adjacent at least one winding support arm. The rotor also includes a plurality of windings, each winding being wrapped axially around each of the at least one winding support arm and a corresponding pole of the rotor core. The rotor is configured such that at least one orifice can transfer lubricant from a surface of the shaft to the plurality of windings.

DETAILED DESCRIPTION OF THE DRAWINGS

An end winding support segment for a generator rotor is disclosed herein that includes a lubricant manifold that provides cooling lubricant, such as oil, from the interior of the rotor, and more specifically, from the rotor shaft, to an electrically conductive wire winding wrapped around a portion of the rotor. The lubricant manifold can include at least one orifice that extends through the end winding support segment and allows oil or another lubricant to pass for the rotor shaft to the windings. The lubricant manifold can also include an annulus on the radially inner surface of the end winding support segment to provide a space for the lubricant to accumulate before passing through the orifice. The annulus can be a metering device to ensure that a proper amount of lubricant is being transferred through the orifice. Additionally, the end winding support segment can include a crowned surface on winding support arms, which are adjacent to the windings, to reduce stresses on the winding while holding the individual wires in place. The end winding support segments (which are multiple sections) can be arranged adjacent to one another so as to together circumferentially encircle the rotor shaft with the annulus on each end winding support segment being shallower near the circumferential end of the winding support segment (near the seam between two end winding support segments) to prevent excessive cooling lubricant loss. There is more than one end winding support segment on each rotor to aid in installation around the rotor shaft. The lubricant manifold (the orifice(s) and annulus) is integrated into the end winding support segment to allow for cooling lubricant, such as oil, to be distributed to the winding without additional and cumbersome lubricant/oil distribution components.

Figure 1:
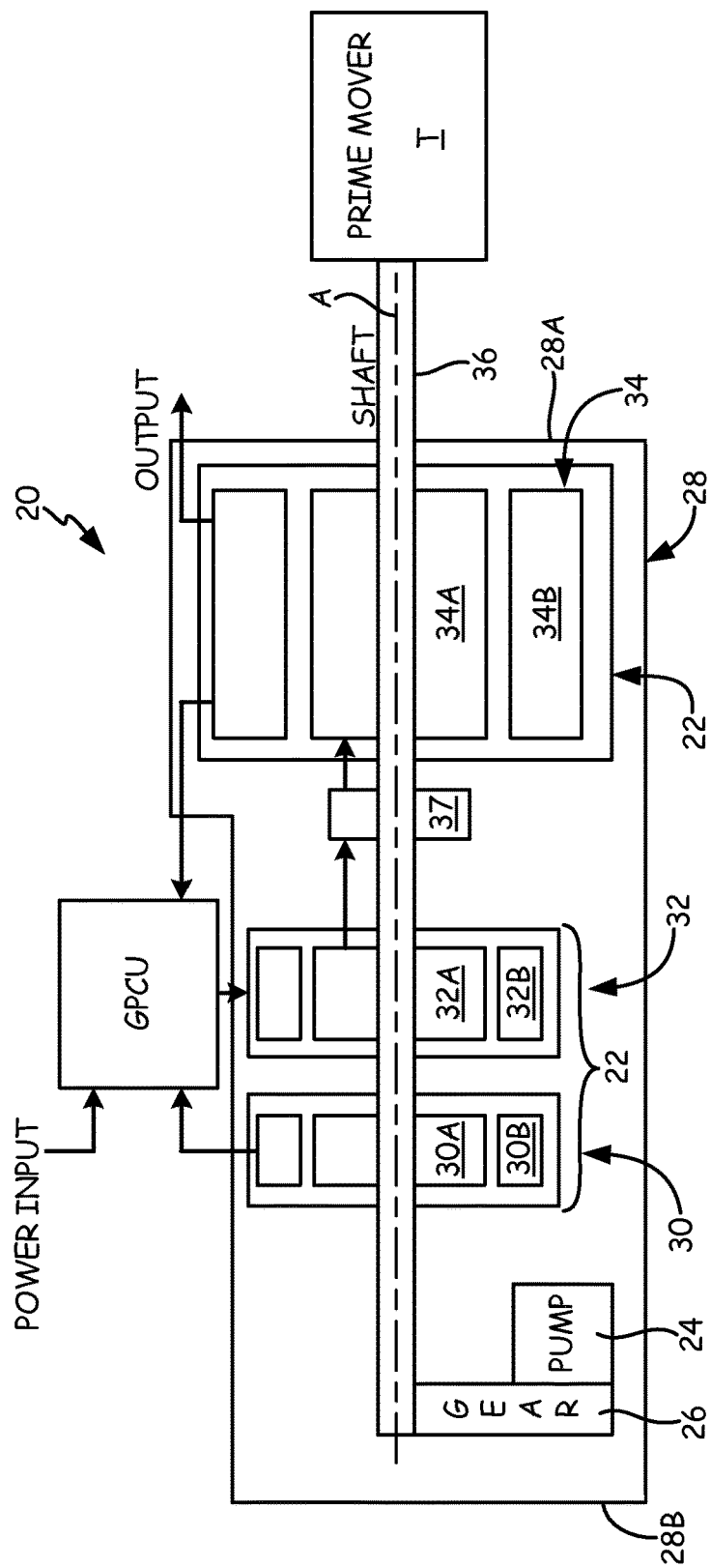
FIG. 1 is a general schematic sectional view of a generator.

FIG. 1 is a general schematic sectional view of a generator. Generator 20 is driven by prime mover T, which can be, for example, a gas turbine engine. Generator 20 produces electrical energy when being driven by prime mover T. Generator 20 generally includes dynamoelectric portion 22, positive displacement pump 24, and gearbox 26, all of which are contained within housing assembly 28. Although a variable frequency generator (VFG) is illustrated in the disclosed embodiment, it should be understood that other generator systems, such as a variable frequency starter generator (VFSG) and integrated drive generator (IDG), are also within the scope of the invention.

Dynamoelectric portion 22 in the disclosed, non-limiting embodiment is a three-phase machine that includes permanent magnet generator 30, main exciter 32, and main generator 34 (the three phases) mounted along rotor shaft 36, which rotates about axis of rotation A. Permanent magnet generator 30 includes rotor assembly 30A and stator assembly 30B, main exciter 32 includes rotor assembly 32A and stator assembly 32B, and main generator 34 includes rotor assembly 34A and stator assembly 34B. Stator assemblies 30B, 32B, and 34B are installed in housing assembly 28 and do not rotate while rotor assemblies 30A, 32A, and 34A are installed on rotor shaft 36 and rotate in unison. Housing assembly 28 may be closed at one end by drive-end cover assembly 28A through which rotor shaft 36 extends and at the other end by non-drive-end cover assembly 28B through which rotor shaft 36 does not extend.

Permanent magnet generator 30, with rotor assembly 30A and stator assembly 30B, supplies power for generator excitation, as well as power for other components of an electrical system. Main exciter 32, with rotor assembly 32A and stator assembly 32B, receives field excitation from permanent magnet generator 30 through the generator power control unit (GPCU). The output of main exciter 32 is supplied to rotor mounted diode pack 37. Diode pack 37 can be divided into six diodes to provide a three-phase full wave bridge rectification. The DC current output of diode pack 37 supplies main generator 34 with electricity. Main generator 34, with rotor assembly (main rotor assembly) 34A and stator assembly (main stator assembly) 34B, outputs power to supply exterior electrical energy needs.

Figure 2A:
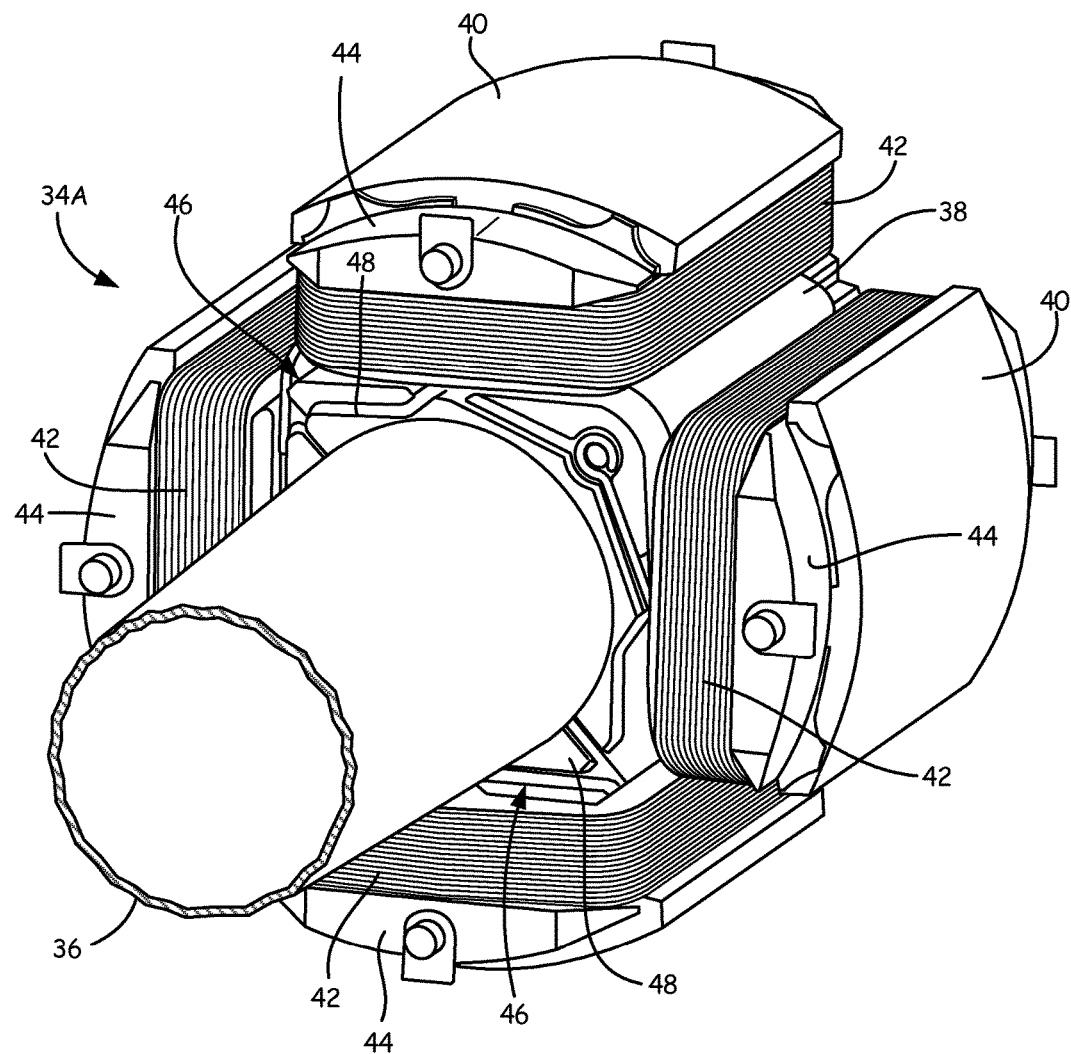
FIG. 2A is a perspective view of a main rotor assembly.
Figure 2B:
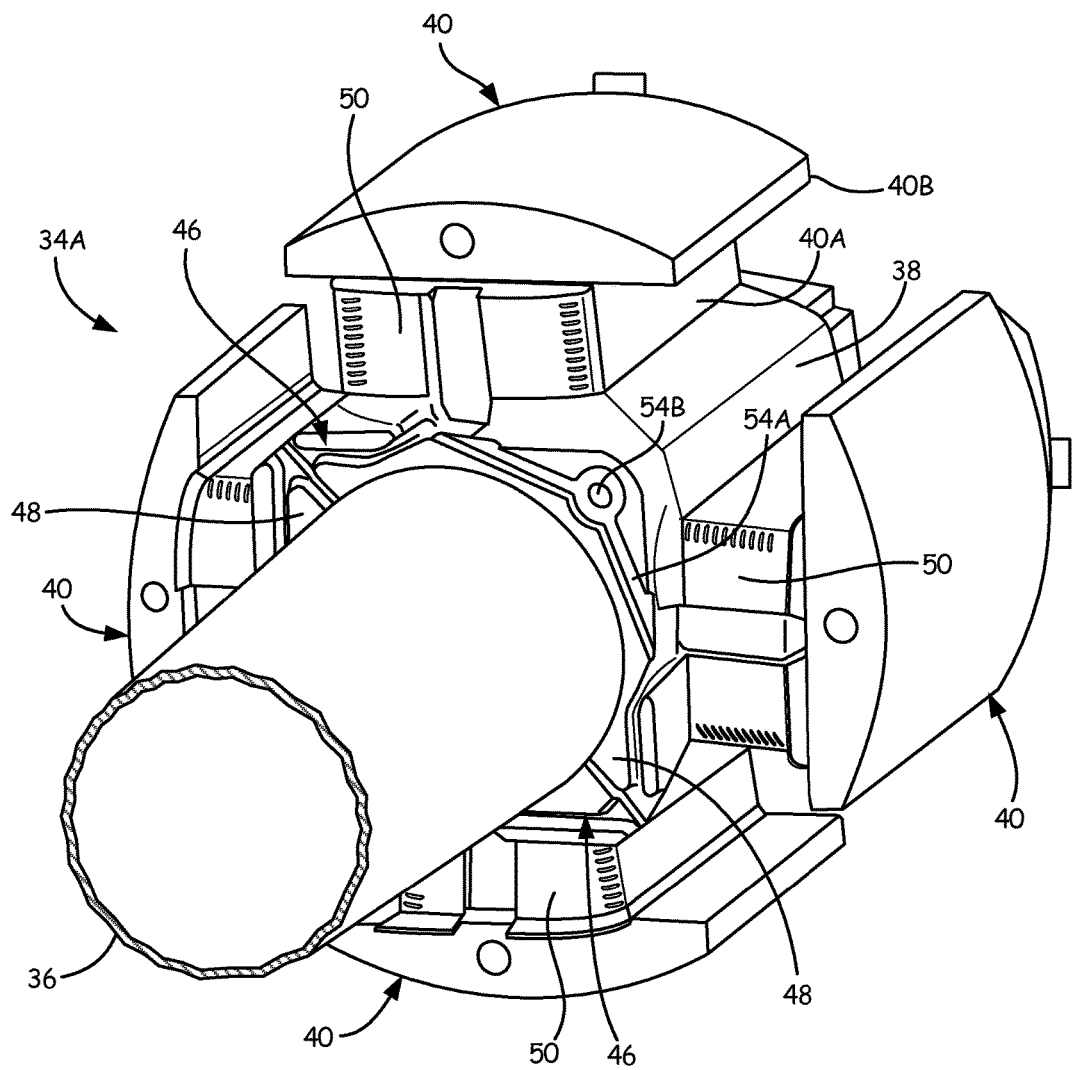
FIG. 2B is a perspective view of a main rotor assembly without windings.

FIG. 2A is a perspective view of main rotor assembly 34A with the windings in view, while FIG. 2B is a perspective view of main rotor assembly 34A without the windings shown. Main rotor assembly 34A includes, among other components, a portion of rotor shaft 36, rotor core 38 (which includes poles 40 having pole body 40A and wings 40B), windings 42, pole winding supports 44, and end winding support segments 46. Ending winding support segments 46 include support segment body 48 and winding support arms 50 (shown in FIG. 2B).

As discussed above, main rotor assembly 34A is radially outward from and mounted on rotor shaft 36 so that main rotor assembly 34A rotates with rotor shaft 36 (which is driven by prime mover T) about axis of rotation A. Rotor shaft 36 can have a constant diameter along the axial length of rotor shaft 36 or can have a varying diameter depending on design considerations.

Rotor core 38 is radially outward from rotor shaft 36 and is the principal structural component of main rotor assembly 34A. Rotor core 38 extends axially along rotor shaft 36 and rotates in unison with rotor shaft 36. Rotor core 38 can be made from a variety of suitable materials, including metal or another material than can handle the elevated temperatures and high centrifugal forces caused by the rotation of rotor assembly 34A.

Poles 40 are radially extending components of rotor core 38. Poles 40 run axially along the outer side of rotor core 38 and can span the entire axial length of rotor core 38. Poles 40 can be made from the same material as rotor core 38, and rotor core 38 and poles 40 can be one continuous piece. While FIGS. 2A and 2B show rotor core 38 having four poles 40, rotor core 38 can have a number of different configurations that include a different number of poles 40, such as configurations that include six or eight poles 40. As seen more easily in FIG. 2B, poles 40 have a generally T shape with pole body 40A that is attached to the body of rotor core 38 and wings 40B that extend circumferentially in both directions. The outer surface of poles 40 can be curved so as to reduce drag on rotor core 38 when rotor shaft 36, rotor core 38, and poles 40 are rotating at high speeds.

Wrapped around each of poles 40 are windings 42, which are each continuous wires that are electrically conductive and wrapped multiple times around pole body 40A of poles 40. The wires of windings 42 can be arranged in a single layer on poles 40 or can be multiple layers of wires. Windings 42 are each connected to diode pack 37, which provides windings 42 with DC current to cause windings 42 to become an electromagnet. When rotor shaft 36, rotor core 38, poles 40, and electromagnetic windings 42 are in operation, they rotate and induce voltage in main stator assembly 34B which is used to output electrical energy.

Pole winding supports 44 are located on each end of poles 40 and configured to hold the ends of each of windings 42 in place. Pole winding supports 44 also function to hold end winding support segments 46 in place. Pole winding supports 44 can be fastened to poles 40 by various means; including adhesive, bolts, rivets, latches, welds, or other fasteners; and can be made from a variety of materials, such as a material that is non-magnetic, including aluminum or plastic.

At each axial end of rotor core 38 (and poles 40) are end winding support segments 46. End winding support segments 46 are configured to provide end support to windings 42 to prevent the wires of windings 42 from becoming displaced due to the centrifugal forces exerted on windings 42 by the rotation of rotor core 38, poles 40, and windings 42. End winding support segments 46 can be made from various suitable materials, including non-magnetic materials such as plastic or aluminum. End winding support segments 46 have a flat back surface (shown in FIGS. 3A and 3B as flat back surface 52) that is fastened to rotor core 38 by various means, including adhesive, welds, bolts, rivets, latches, or other fasteners. End winding support segments 46 each also have a curved inner surface (shown in FIGS. 3A and 3B as curved inner surface 56) that is adjacent to rotor shaft 36 and rotate with rotor core 38 when generator 20 is in operation.

One end winding support segment 46 does not completely extend circumferentially around rotor shaft 36 but, when multiple end winding support segments 46 are taken together, end winding support segments 46 circumferentially encircle rotor shaft 46. In FIGS. 2A and 2B, two end winding support segments 46 are present at each end of rotor core 38. The use of multiple sections of end winding support segment 46 (more than one at each end of rotor core 38) facilitates easy installation of end winding support segments 46. Because one end winding support segment 46 does not extend completely around rotor shaft 36, each end winding support segment 46 does not need to be put into place adjacent to rotor core 38 (does not need to be threaded onto rotor shaft 36) until after other components of generator 20 have been put in place on each end of rotor shaft 36. While FIGS. 2A and 2B show two end winding support segments 46 on each end of rotor core 38, other designs can include any number of end winding support segments 46 that extend less than 180 degrees around rotor shaft 36.

Figure 3A:
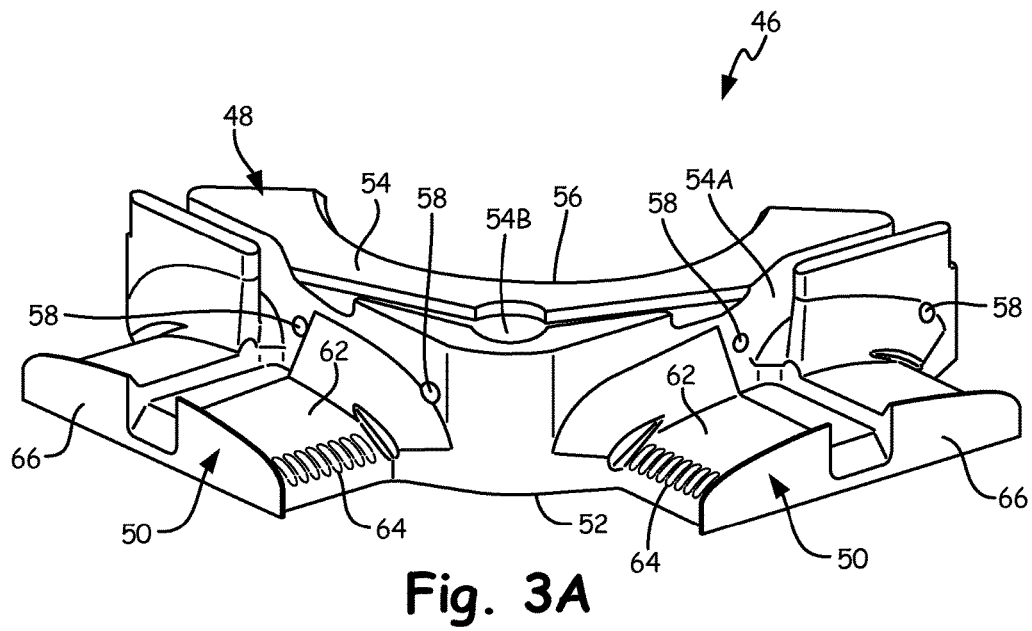
FIG. 3A is one perspective view of an end winding support segment.
Figure 3B:
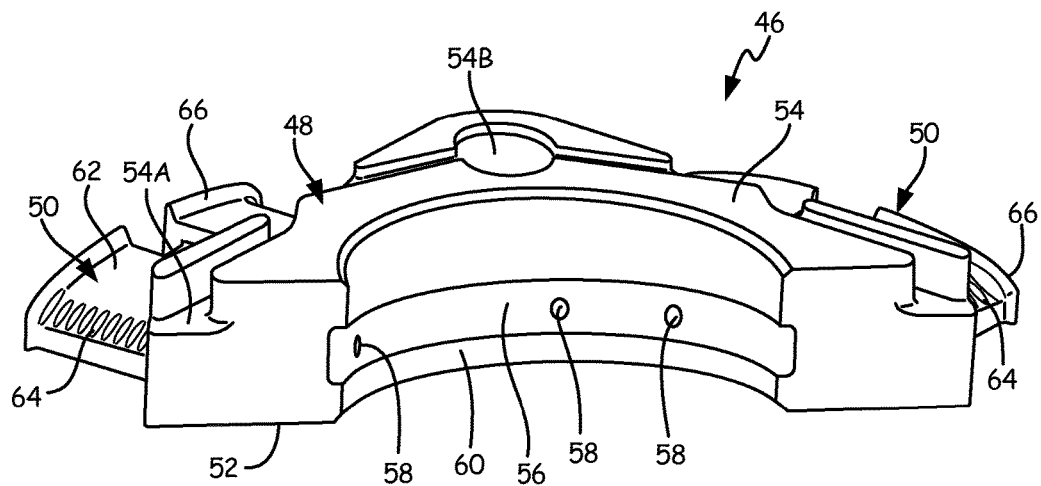
FIG. 3B is another perspective view of the end winding support segment.

Each end winding support segment 46 includes support segment body 48 (which is radially adjacent to rotor shaft 38) and winding support arms 50 (which extend radially outward from support segment body 48). A flat back surface (shown in FIGS. 3A and 3B as flat back surface 52) of support segment body 48 is adjacent to rotor core 38 and can be fastened to rotor core 38, while the radially inner surface of support segment body 48 (curved inner surface 56 in FIGS. 3A and 3B is adjacent to rotor shaft 36 and can be fastened to rotor shaft 36. The circumferential ends of support segment body 48 on each end winding support segment 46 abut another support segment body 48 on an adjacent end winding support segment 46 to form a seam between the two adjacent support segment bodies 48 on two adjacent end winding support segments 46 (discussed in further detail with regards to FIGS. 3A and 3B) so that multiple support segment bodies 48 together completely encircle rotor shaft 36. The outer surface of supports 48 (the surface opposite the flat back surface adjacent rotor core 38, shown in FIGS. 3A and 3B as outer surface 54) can include grooves 54A, bolt holes 54B, or other features. Support segment bodies 48, when taken together, can have a rectangular shape (when rotor core 38 includes four poles 40), a hexagonal shape (when rotor core 38 includes six poles 40), or another shape as is needed by the design, such as a circular shape, triangular shape, or octagonal shape. Additionally, support segment bodies 48 can abut one another at any point circumferentially around end winding support segment 46, including at a point between winding support arms 50 (as shown in FIGS. 2A, 2B, 3A, and 3B) or at a point that splits one winding support arm 50 into two sections.

Extending radially outward from support segment body 48 and supporting the ends of windings 42 are winding support arms 50. A flat back surface of winding support arms 48 (shown in FIGS. 3A and 3B as flat back surface 52) is attached to rotor core 38, while the outer surface of winding support arms 50 (shown in FIGS. 3A and 3B as winding contact surface 62) is configured to support windings 42 to prevent windings 42 from becoming displaced during operation. Each end winding support segment 46 has at least one winding support arm 50 but; as shown in FIGS. 2A, 2B, 3A, and 3B; each end winding support segment 46 can have two or more winding support arms 50. As will be discussed in greater detail below, the outer surface of winding support arms 50 (shown in FIGS. 3A and 3B as winding contact surface 62) can have a crowned configuration to reduce the stresses on windings 42 and also can include grooves (shown in FIGS. 3A and 3B as wire grooves 64) to prevent the individual wires of windings 42 from movement. Each end winding support segment 46 includes other features, such as a lubricant manifold, which will be discussed in FIGS. 3A and 3B.

Figure 3C:
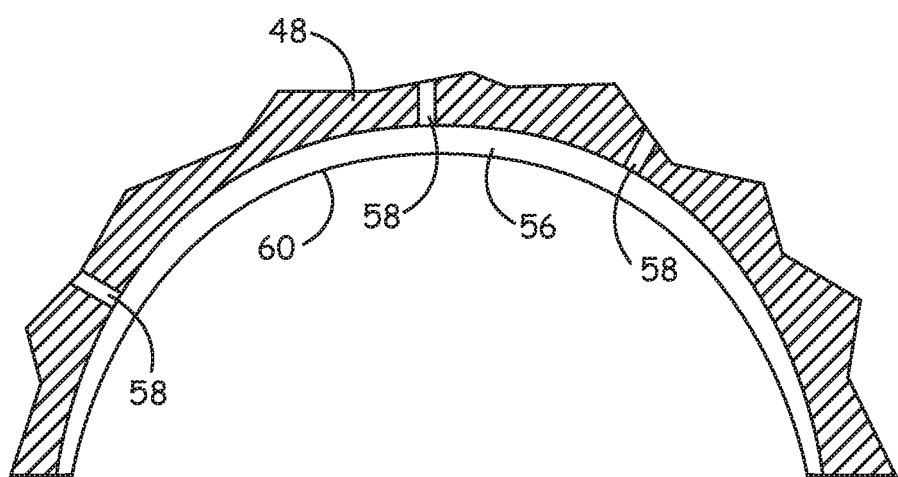
FIG. 3C is a partial cross-sectional view of the end winding support segment.

FIG. 3A is one perspective view of end winding support segment 46, FIG. 3B is another perspective view of end winding support segment 46, and FIG. 3C is a partial cross-sectional view of end winding support segment 46. End winding support segment 46 includes support segment body 48 and winding support arms 50, both of which have flat back surface 52. Support segment body 48 includes outer surface 54 (having grooves 54A and bolt holes 54B), curved inner surface 56, orifices 58, and annulus 60 (together orifices 58 and annulus 60 make up the lubricant manifold). Winding support arms 50 include winding contact surface 62, wire grooves 64, and lip 66. As shown in FIG. 3C, annulus 60 has a varying groove depth into support segment body 48.

As discussed above, curved inner surface 56 of support segment body 48 is radially adjacent to rotor shaft 36, while flat back surface 52 is adjacent to rotor core 38. Flat back surface 52 is a bottom surface not viewable in either of FIG. 3A or 3B. Support segment body 48 also has two circumferential ends that abut another support segment body 48 on another end winding support segment 46 so that curved inner surfaces 56 of each end winding support segment 46 completely encircle rotor shaft 38 (as shown in FIGS. 2A and 2B). The abutting support segment bodies 48 can be fastened to one another by various means, including adhesive, welds, bolts, clasps, rivets, latches, or other fasteners. Additionally, the abutting support segment bodies 48 do not need to be fastened to one another and can be held adjacent to one another through each support segment body 48 being fastened to rotor core 38 on flat back surface 52 and/or rotor shaft 36 on curved inner surface 56.

End winding support segment 46 is shown in FIGS. 3A and 3B as having two winding support arms 50 extending radially outward from support segment body 48. In FIGS. 3A and 3B, winding support arms 50 extend outward from support 48 at an angle that is perpendicular to a line tangent to curved inner surface 56 (like rays extending outward from a center point), but in other designs winding support arms 50 can extend outward from support segment body 48 at another angle so as to be axially aligned with poles 40 of rotor core 38, such as an angle that is non-parallel to a line perpendicular to curved inner surface 56.

Flat back surface 52 of end winding support segment 46 (a rear surface of both support segment body 48 and winding support arms 50) attaches to rotor core 38 and poles 40. Winding contact surface 62 of winding support arms 50, which is opposite flat back surface 52, is in contact with windings 42 and prevents windings 42 from displacing when generator 20 is in operation. Winding contact surface 62 can be crowned to reduce the stresses on windings 42 and can include wire grooves 64 to prevent the individual wires of windings 42 from movement. Winding support arms 50, and support segment body 48, can include other grooves 54A or indents that allow cooling air or lubricant/oil to access various components of main rotor assembly 34A. Additionally, winding support arm 50 can include a lip 66 on the radially outward end to aid in keeping windings 42 from moving. When rotor core 38 has a configuration that includes four poles 40, winding support arms 50 will extend radially away from support segment body 48 at an angle 90 degrees from adjacent winding support arms 50 so as to be axially aligned with poles 40.

Within support segment body 48 are orifices 58 and annulus 60, which together transfer and disperse lubricant, such as oil, from the surface of rotor shaft 36 to windings 42. Orifices 58 are holes that extend through support segment body 48 from curved inner surface 56 to the radially exterior surface of support segment body 48 adjacent winding support arms 50. Support segment body 48 can include any number of orifices 58 having any orientation, with a preferred configuration that transfers lubricant to windings 42 at a rate that keeps windings 42 sufficiently cool without wasting or inefficiently using more lubricant than needed. FIGS. 3A and 3B show a configuration that includes two orifices 58 per winding support arm 50, with each of orifices 58 being at an angle that is non-perpendicular to a line tangent to curved inner surface 56. Additionally, each orifice 58 can have a varying cross-sectional area as orifice 58 extends through support segment body 48, such as an opening on curved inner surface 56 that is smaller or larger than the opening on the radially exterior surface of support segment body 48.

Annulus 60 is an annular groove on curved inner surface 56. Annulus 60 provides a gap between support segment body 48 and rotor shaft 36 in which a lubricant, such as oil, can accumulate and then be transferred through orifices 58 to winding support arms 50 and windings 42. The size and depth of annulus 60 is configured to meter the amount of lubricant allowed to flow through orifices 58 so that the lubricant is not used inefficiently. Additionally, the opening of orifices 58 on curved inner surface 56 can be placed in annulus 60 to allow for lubricant to flow directly from annulus 60 into orifices 58, or the opening of orifices 58 on curved inner surface 56 can be near but not in annulus 60 to allow for the lubricant to first flow along curved inner surface 56 before entering orifices 58. Annulus 60 can have a constant or varying groove depth depending on design considerations, such as a shallower depth near the ends of each support segment body 48 (near the seams between adjacent support segment bodies 48) to prevent excessive lubricant loss into the seams. Also, annulus 60 can be a varying distance (axially) from flat back surface 52 or can be a number of annular grooves suited to meter the amount of lubricant transferred to orifices 58.

As mentioned above, winding contact surface 62 of winding support arms 50 can be crowned to reduce stresses on windings 42 while holding the individual wires in place to prevent displacement during the operation of generator 20. Additionally, end winding support segment 46, and specifically segment support body 48, includes a lubricant manifold (orifices 58 and annulus 60) that provides lubricant, such as oil, to windings 42 from the interior of support segment body 48, and more specifically from curved inner surface 56 and rotor shaft 36. Orifices 58 transfer the lubricant/oil while annulus 60 meters the flow of lubricant to ensure that a sufficient amount of lubricant/oil is being transferred to windings 42 while preventing excessive lubricant loss. End winding support segment 46 is made up of more than one section to aid in installation around rotor shaft 36 so that each end winding support segment 46 can be installed onto rotor core 38 and rotor shaft 36 after other components have been placed on the ends of rotor shaft 36. Orifices 58 and annulus 60 are integrated into support segment body 48 to allow for lubricant to be distributed to windings 42 without additional and cumbersome lubricant/oil distribution components, therefore reducing cost, increasing efficiency, and improving durability.

DISCUSSION OF POSSIBLE EMBODIMENTS

The following are non-exclusive descriptions of possible embodiments of the present invention.

An end winding support segment for a generator rotor includes a support segment body with a curved inner surface configured to be adjacent to a rotor shaft, a winding support arm extending radially outward from the support segment body, and an orifice extending from the curved inner surface of the support segment body to an exterior surface of the support segment body adjacent the winding support arm with the orifice configured to transfer lubricant from a surface of the rotor shaft to a winding located on the winding support arm.

The end winding support segment of the preceding paragraph can optionally include, additionally and/or alternatively, any one or more of the following features, configurations and/or additional components:

At least two winding support arms extend radially outward from the support segment body.

At least two winding support arms extend outward from the support segment body at an angle perpendicular to the curved inner surface of the support segment body.

At least two winding support arms extend radially outward from the support segment body at approximately a 90 degree angle from one another.

An annulus on the curved inner surface of the support is provided for metering the amount of lubricant transferred to the winding through the orifice.

A depth of the annulus is varied.

A depth of the annulus is reduced near a circumferential end of the support segment body.

At least two orifices are arranged to provide a sufficient amount of lubricant to the winding.

At least two orifices are angled to be non-parallel to a line perpendicular to the curved inner surface of the support segment body.

A winding contact surface of the winding support arm is crowned.

The end winding support segment is constructed from plastic.

A rotor for a generator includes a shaft, a rotor core radially outward from the shaft and having a plurality of poles spanning axially along the rotor core, and a plurality of end winding support segments that together circumferentially encircle the shaft with each end winding support segment being radially outward from the shaft, adjacent to the rotor core on a flat back surface, and adjacent to another end winding support segment on a circumferential surface. Each end winding support segment includes a support segment body with a curved inner surface adjacent to the shaft, at least one winding support arm extending radially outward from the support segment body and having a flat back surface adjacent to a corresponding pole of the rotor core, and at least one orifice extending from the curved inner surface of the support segment body to an exterior surface of the support segment body adjacent the at least one winding support arm. The rotor also includes a plurality of windings with each winding being wrapped axially around each of the at least one winding support arm and a corresponding pole of the rotor core. The at least one orifice is configured to transfer lubricant from a surface of the shaft to the plurality of windings.

The rotor of the preceding paragraph can optionally include, additionally and/or alternatively, any one or more of the following features, configurations and/or additional components:

An annulus on the curved inner surface of the support segment body is provided for metering the amount of lubricant transferred to the plurality of windings through the at least one orifice.

An annulus of each end winding support segment has a depth that is reduced near a circumferential end of the support.

At least one winding support arm of each end winding support segment has a crowned winding contact surface opposite the flat back surface.

The plurality of end winding support segments includes two ending winding support segments that each extend half way around a circumference of the shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An end winding support segment for a generator rotor comprising:
   a support segment body with a curved inner surface between a first circumferential end and a second circumferential end configured to be adjacent to a rotor shaft;
   a winding support arm extending radially outward from the support segment body;
   a groove on the curved inner surface of the support segment body, the groove having a depth that is varied as the groove extends circumferentially between the first circumferential end of the support segment body and the second circumferential end of the support segment body; and an orifice extending from the groove to an exterior surface of the support segment body adjacent the winding support arm.

2. The end winding support segment of claim 1, wherein at least two winding support arms extend radially outward from the support segment body.

3. The end winding support segment of claim 2, wherein the at least two winding support arms extend outward from the support segment body at an angle perpendicular to the curved inner surface of the support segment body.

4. The end winding support segment of claim 2, wherein the at least two winding support arms extend radially outward from the support segment body at approximately a 90 degree angle from one another.

5. The end winding support segment of claim 1, wherein the depth of the groove is reduced near the first circumferential end and the second circumferential end of the support segment body.

6. The end winding support segment of claim 1, wherein at least two orifices are arranged to provide a sufficient amount of lubricant to the winding.

7. The end winding support segment of claim 1, wherein a winding contact surface of the winding support arm is crowned.

8. The end winding support segment of claim 1, wherein the end winding support segment is constructed from plastic.

9. A rotor for a generator comprising:
   a shaft;
   a rotor core radially outward from the shaft and having a plurality of poles spanning axially along the rotor core;
   a plurality of end winding support segments that together circumferentially encircle the shaft, each end winding support segment being radially outward from the shaft, adjacent to the rotor core on a flat back surface, and adjacent to another end winding support segment on a circumferential surface, each end winding support segment comprising:
      a support segment body with a curved inner surface adjacent to the shaft extending between a first circumferential end and a second circumferential end;
      at least one winding support arm extending radially outward from the support segment body and having a flat back surface adjacent to a corresponding pole of the rotor core; and
      at least one orifice extending from the curved inner surface of the support segment body to an exterior surface of the support segment body adjacent the at least one winding support arm;
      a groove on the curved inner surface of the support segment body, the groove having a depth that is reduced in a circumferential direction near the first circumferential end and the second circumferential end of the support segment body to prevent excessive lubricant loss into seams between adjacent end winding support segments; and
   a plurality of windings, each winding being wrapped axially around each of the at least one winding support arm and a corresponding pole of the rotor core.

10. The plurality of end winding support segments of claim 9, wherein the at least one winding support arm of each end winding support segment has a crowned winding contact surface opposite the flat back surface.

11. The rotor of claim 9, wherein the plurality of end winding support segments includes two ending winding support segments that each extend half way around a circumference of the shaft.

12. The rotor of claim 9, wherein each end winding support segment of the plurality of end winding support segments includes at least two orifices.

* * * * *